UNITED STATES PATENT OFFICE.

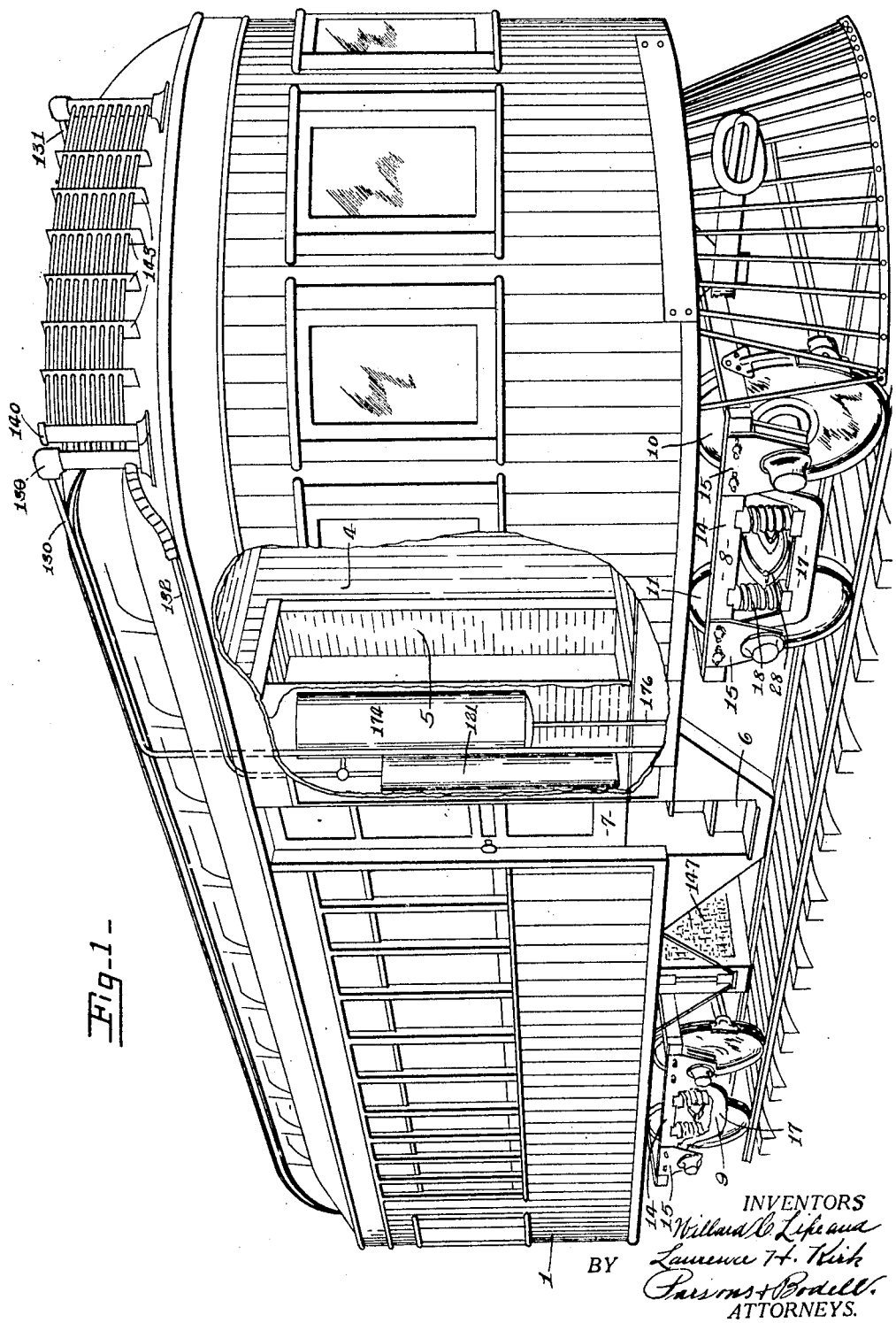

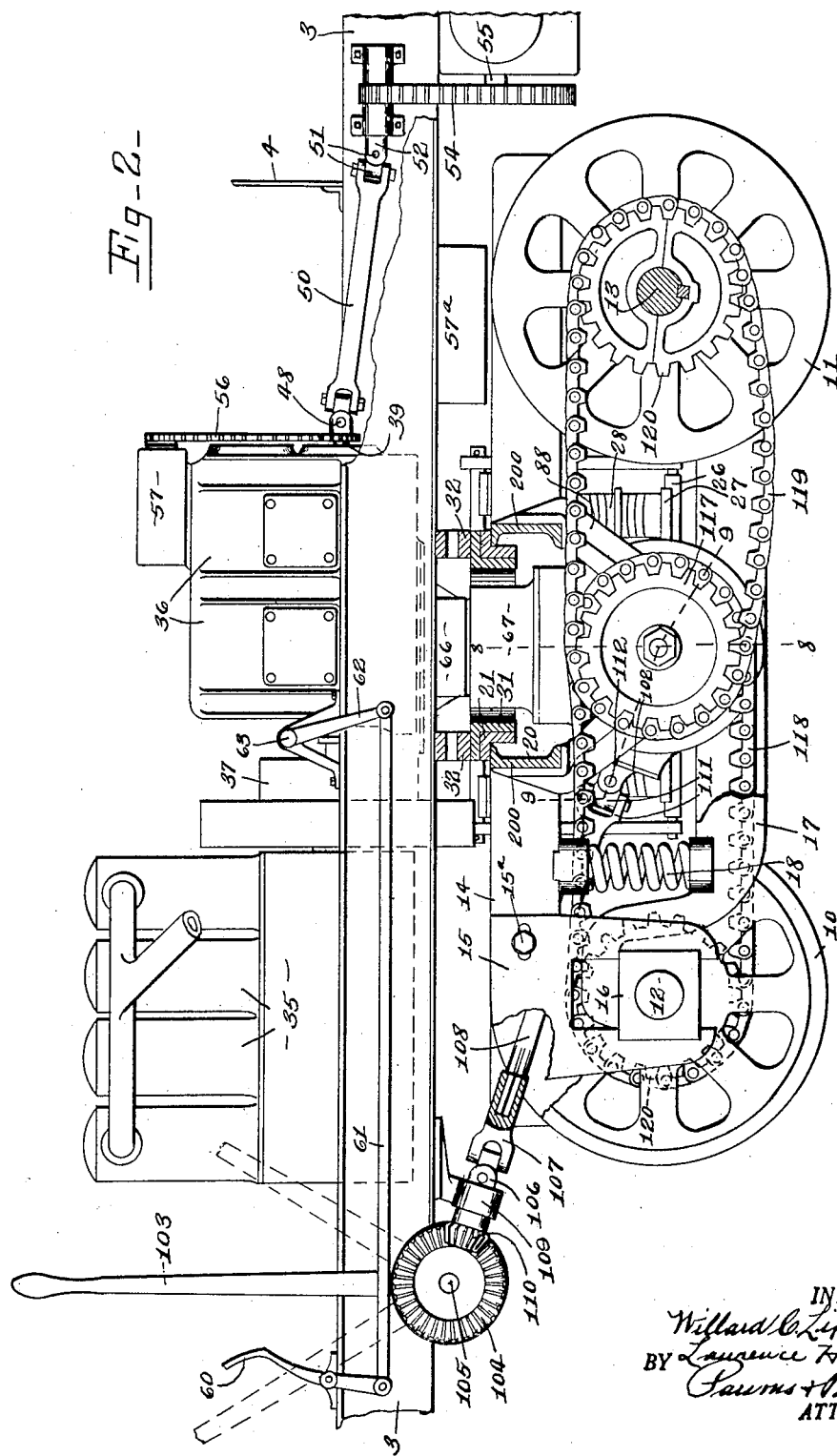

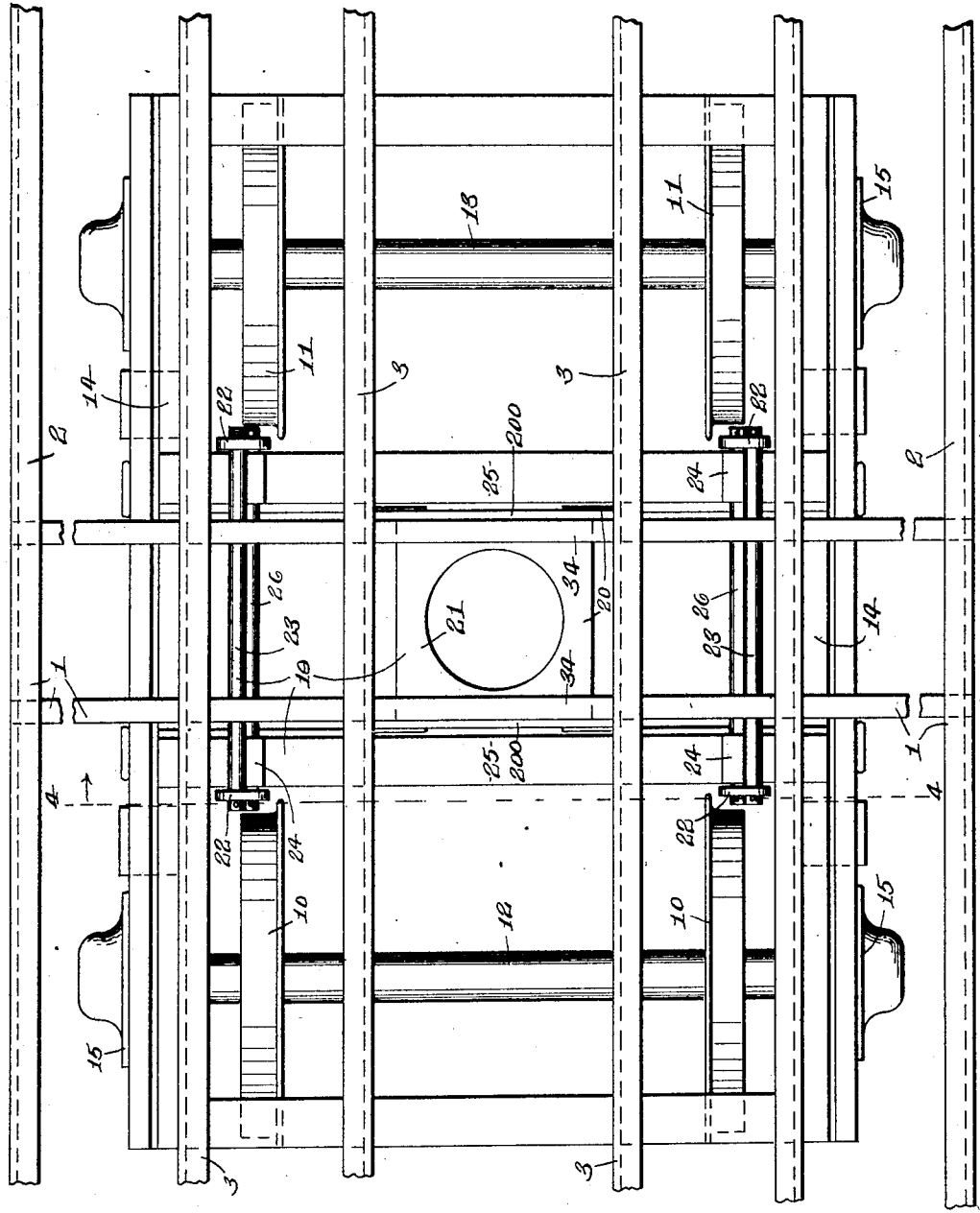

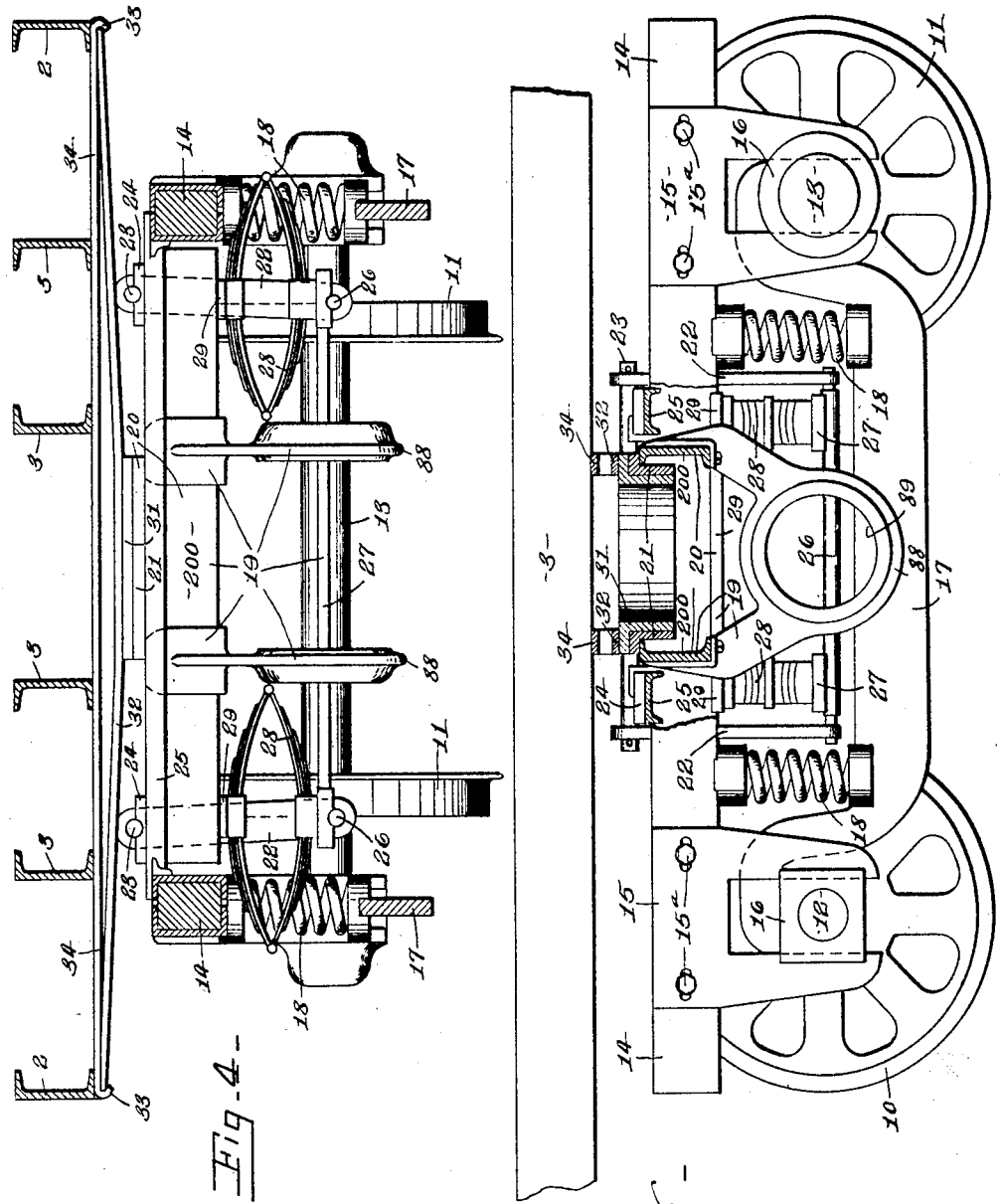

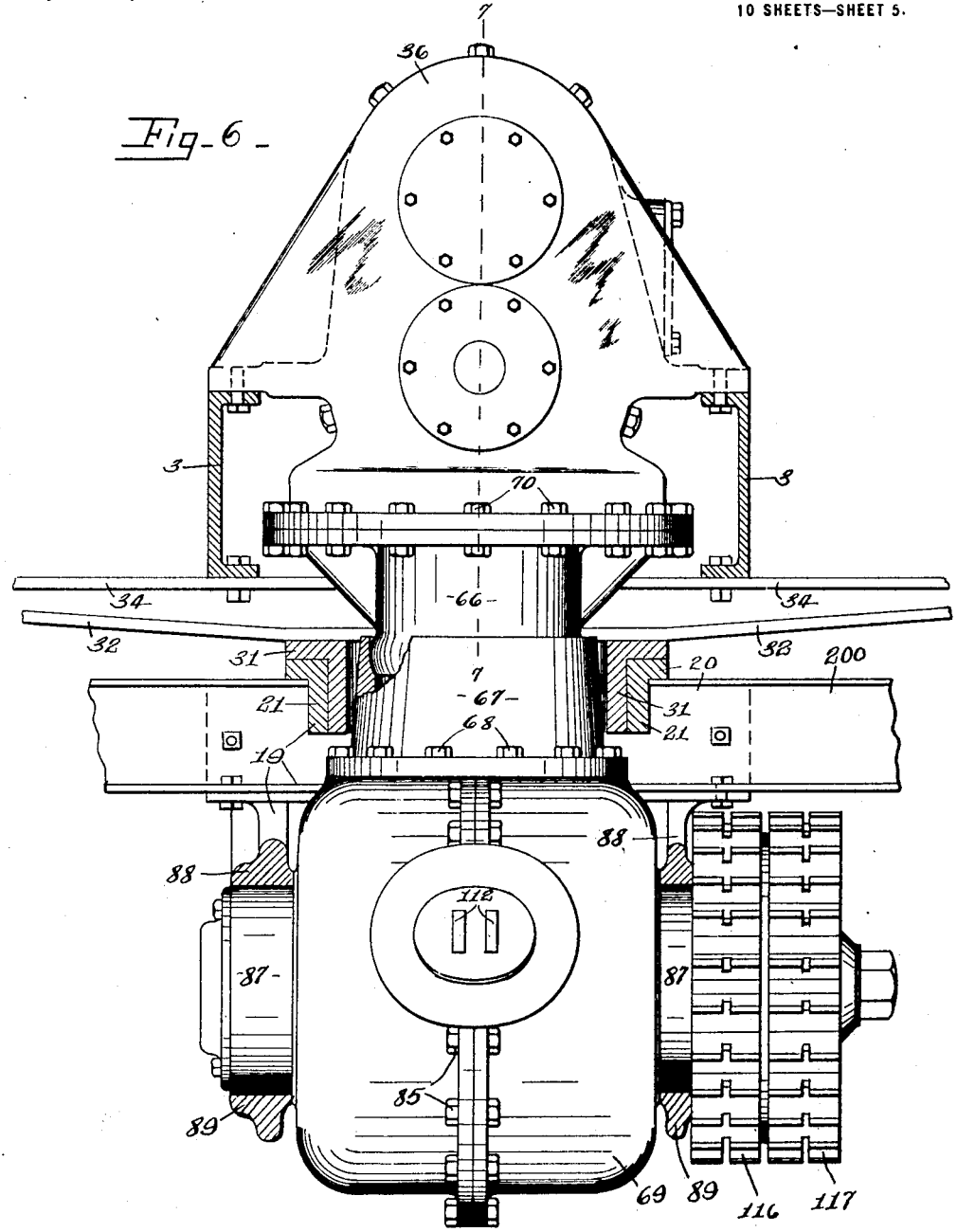

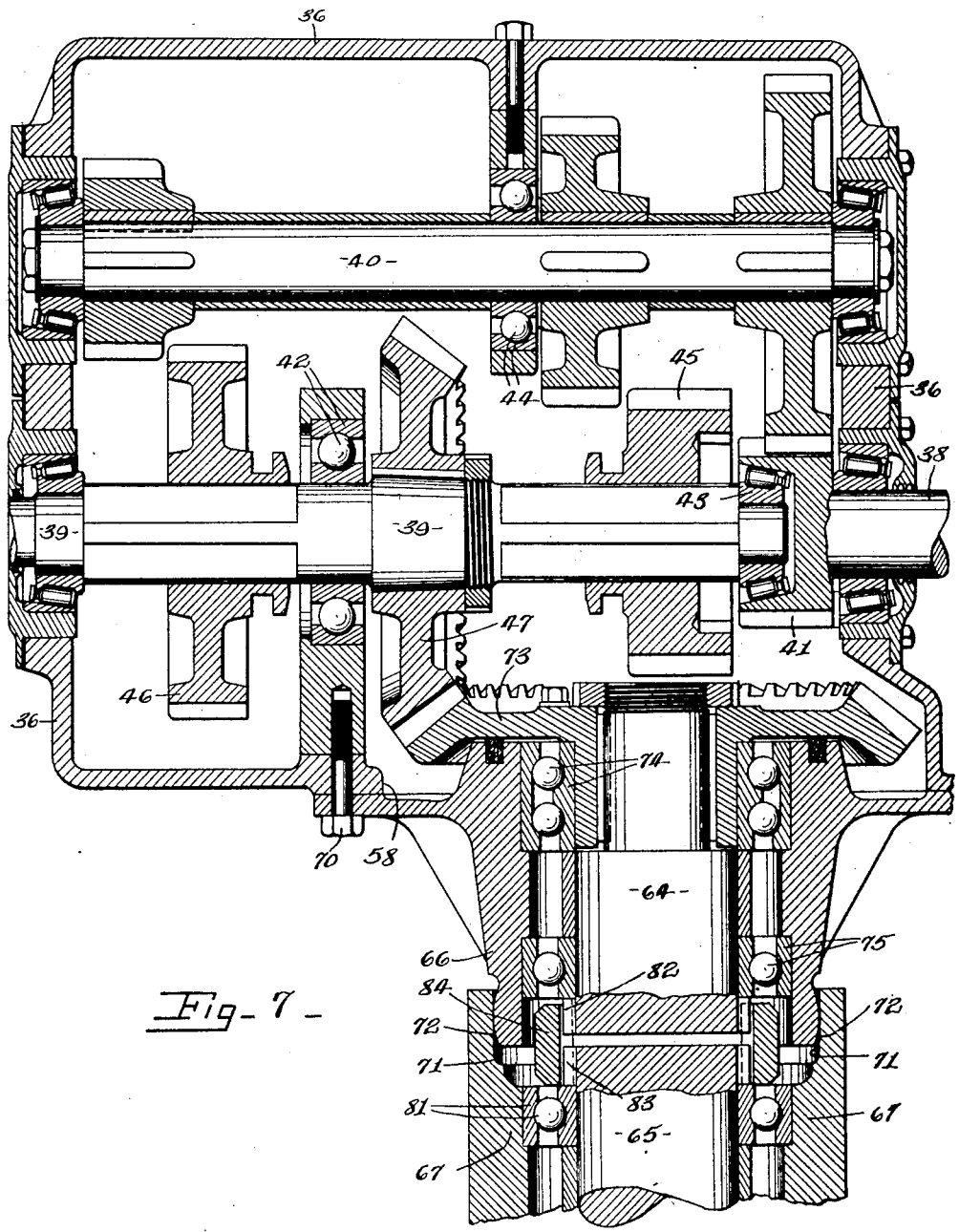

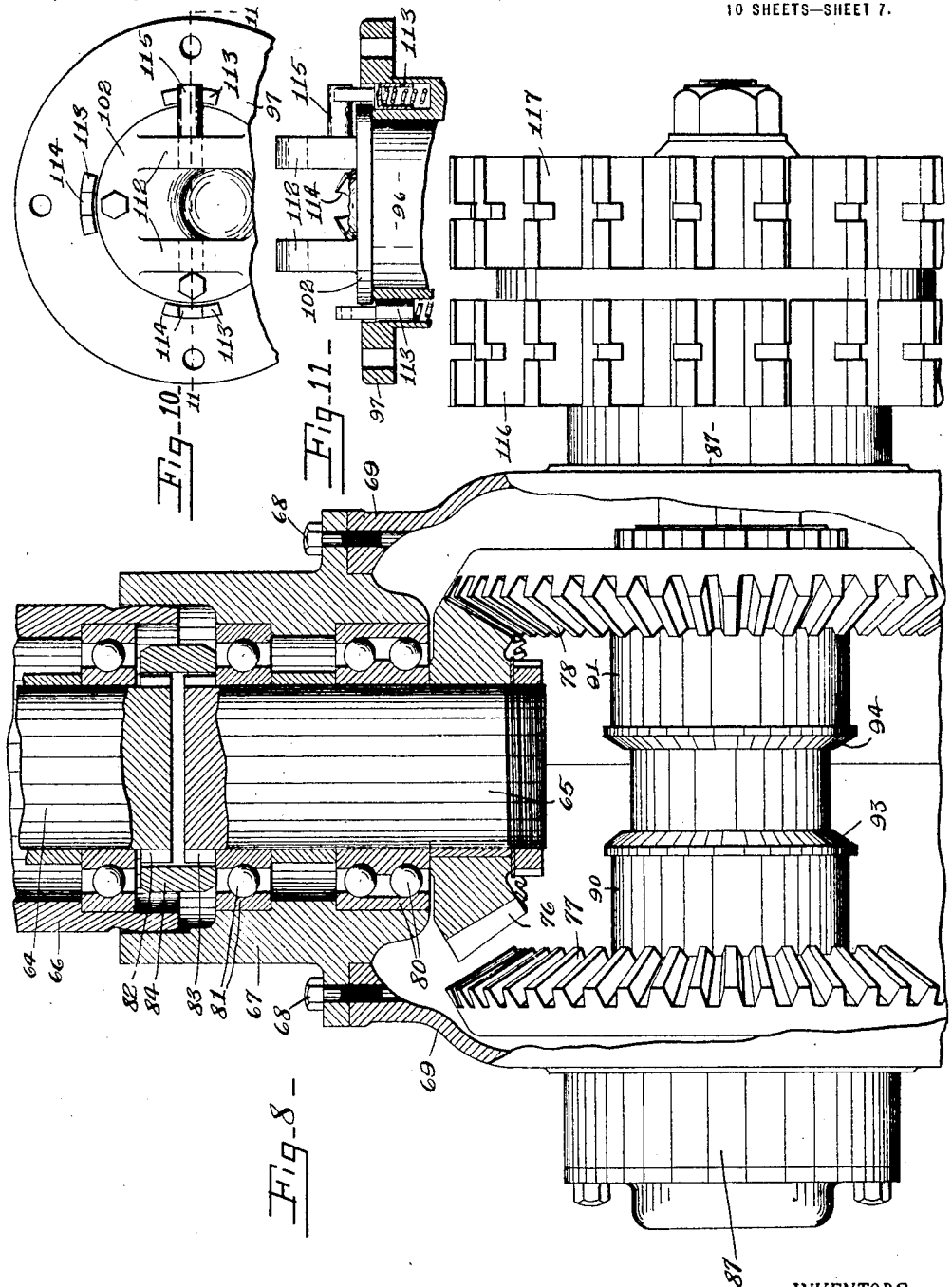

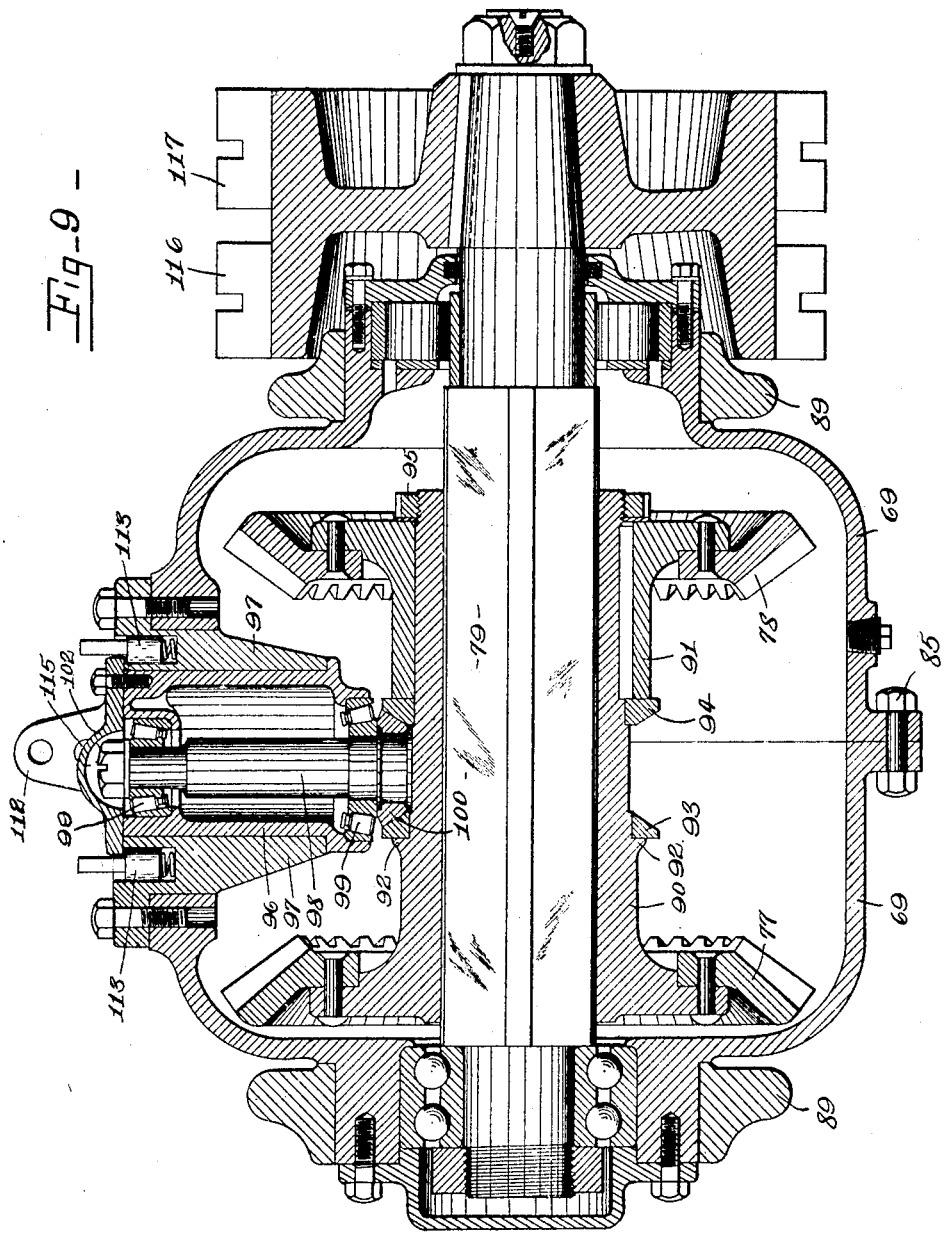

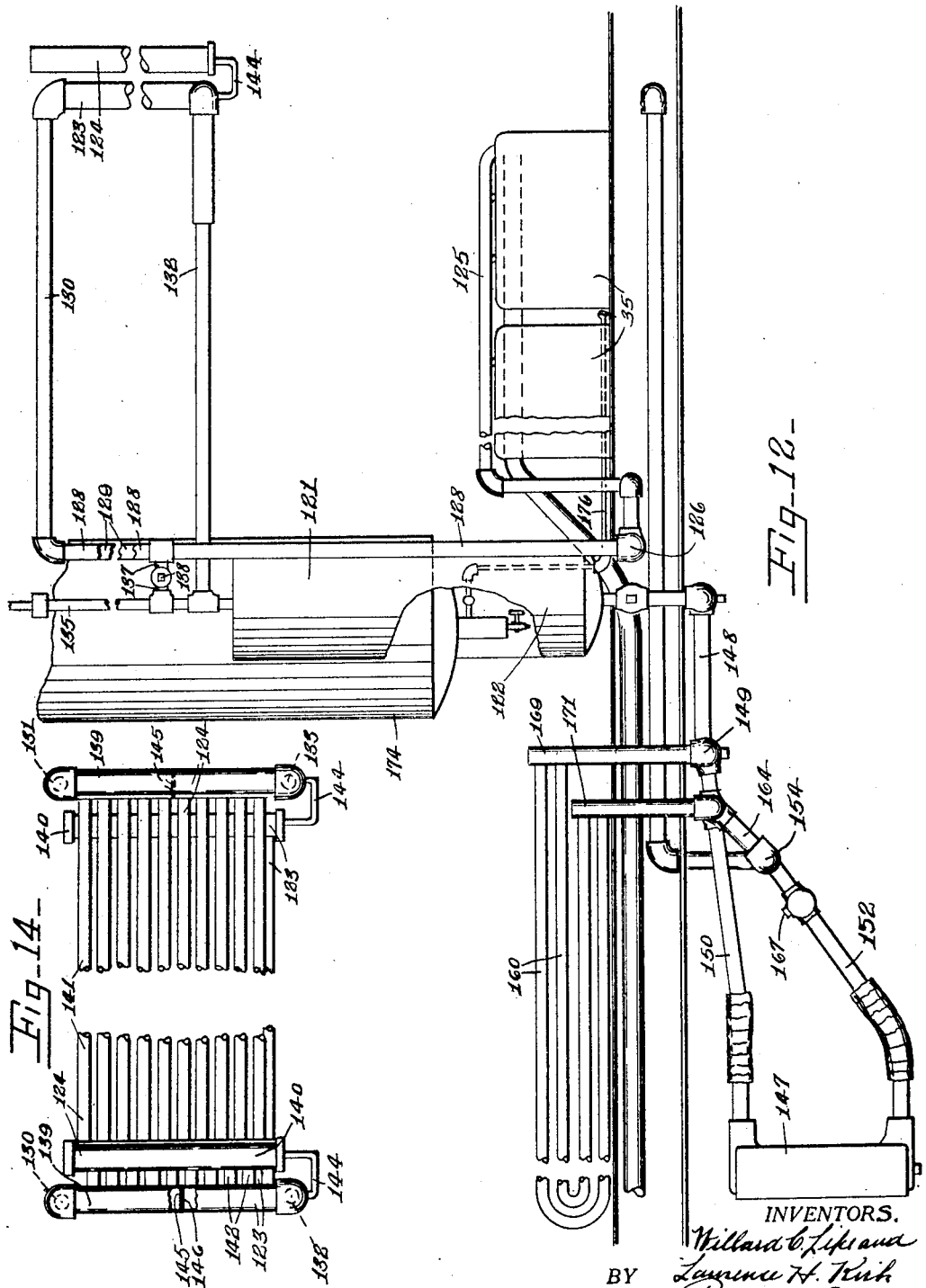

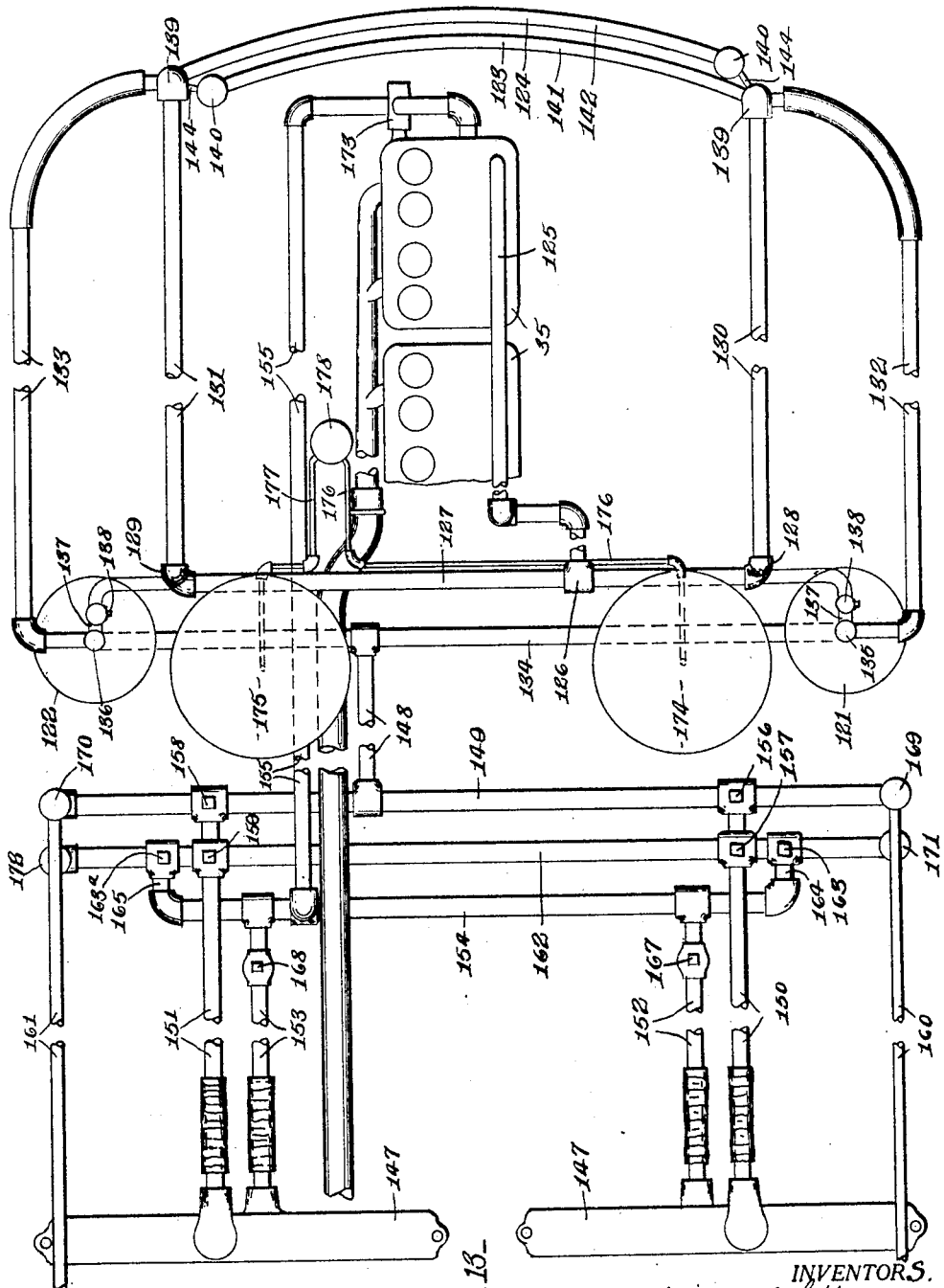

WILLARD C. LIPE, OF SYRACUSE, NEW YORK, AND LAURENCE H. KIRK, OF HAVRE DE GRACE, MARYLAND.

RAILWAY MOTOR-CAR.

1,393,146.      Specification of Letters Patent.      Patented Oct. 11, 1921.

Application filed April 15, 1916. Serial No. 91,391.

*To all whom it may concern:*

Be it known that we, WILLARD C. LIPE, a citizen of the United States, and a resident of Syracuse, in the county of Onondaga and State of New York, and LAURENCE H. KIRK, a citizen of the United States, and a resident of Havre de Grace, in the county of Harford and State of Maryland, have invented a certain new and useful Railway Motor-Car, of which the following is a specification.

This invention relates to motor vehicles, and especially to railway motor vehicles the bodies of which are supported by trucks, double or single; and the invention has for its object a particularly simple and efficient means for mechanically transmitting the power from the motor to the drive wheels of the truck, and a highly simple and efficient arrangement of the internal combustion engine, its cooling and fuel systems, and the car heating means; and the invention consists in the novel combinations hereinafter set forth and claimed.

In describing this invention, reference is had to the accompanying drawings in which like characters designate corresponding parts in all the views.

Figure 1 is a perspective view, partly broken away, of a railway motor car embodying our invention.

Fig. 2 is a side elevation, partly in section, and partly broken away, of the front portion of the frame of the car body and the front truck, showing the body frame of the car, one of the four wheel trucks, the power plant unit including the internal combustion engine and change speed gearing, and the power transmitting means carried by the truck.

Fig. 3 is a fragmentary plan view of the car body frame and the truck, parts carried thereby being removed.

Fig. 4 is a sectional view taken on line 4—4, Fig. 3.

Fig. 5 is an elevation, partly in section, of parts seen in Fig. 4.

Fig. 6 is an elevation, partly in section, of the casing containing the change speed gearing, and the power transmitting mechanism between the gearing and the wheels of the truck, the contiguous portions of the body frame and the truck frame being also shown.

Fig. 7 is an enlarged sectional view taken on the plane of line 7—7, Fig. 6.

Fig. 8 is an enlarged sectional view taken on the plane of line 8—8, Fig. 2, parts being omitted.

Fig. 9 is a sectional view taken on the plane of line 9—9, Fig. 2.

Figs. 10 and 11 are detail views of the lock for the reversing gearing, Fig. 10 being a fragmentary plan view, and Fig. 11 a section on line 11—11, Fig. 10.

Fig. 12 is a detail view, partly broken away, of the water cooling system of the engine and the heating system of the car.

Fig. 13 is a plan view of parts seen in Fig. 12.

Fig. 14 is an elevation, partly broken away, of the radiator on the roof of the car.

This motor vehicle comprises, generally, a body, a truck, a motor carried by the body, and power transmitting mechanism between the motor and one or more wheels of the truck.

The invention is here shown as embodied in the type of car having double trucks, that is, front and rear four wheel trucks, the power being applied to one of the trucks, and the trucks being connected to the car body to swivel or move about the vertical axes of center bolster plates or fifth wheel sections.

The power transmitting mechanism includes portions or sections arranged centrally with the vertical axis of one of the trucks, one of these portions or sections being rigid with the car body and the other with the bolster of the truck, and these portions or sections being connected by a joint which permits the car body and the truck to have relative rocking movement without interfering with the transmitting action of the power transmitting mechanism.

1 designates the car body which usually includes side sills 2 and longitudinally extending lengthwise beams 3 located between the side sills and supporting the power plant unit, to be presently described, and the flooring and remaining parts of the car body. The frame of the car body also includes suitable cross bars.

The car body 1 is divided transversely into two compartments by a hollow partition or bulk head 4, having a door way 5 located substantially midway between the sides of the car body, and providing hollow compartments or chambers on opposite sides of the door way, which open through the flooring of the car on opposite sides of said door way, and contain parts of the fuel and cooling systems to be presently described.

The passenger compartment of the car has steps 6 and a door 7 located directly behind the bulk head 4.

The car body is here shown as supported by front and rear trucks 8, 9, which are similar in construction, with the exception that the front truck 8 supports power transmitting mechanism which is connected to the wheels thereof to drive the car.

The truck 8 comprises front and rear pairs of wheels 10, 11 mounted upon axles 12, 13, a frame including side members or wheel pieces 14 carrying pedestals 15 in which slide the journal boxes 16 mounted on the axles 12, 13, equalizing bars 17 resting at their opposite ends on the front and rear journal boxes 16, equalizing springs 18 interposed between the bars 17 and the wheel pieces 14, and a bolster frame 19 in the form of a cradle carrying a spring supported bolster 20 having a center plate or fifth wheel section 21.

The pedestals 15 are connected to the wheel pieces 14 by means of bolts 15$^a$ extending through slots in the pedestals, the bolts and slots permitting adjustment of the pedestals forwardly and rearwardly to tighten the chains of the transmission gearing.

The bolster frame 19 comprises suspension rods 22, see Figs. 4 and 5, located on opposite sides of the truck frame and mounted at their upper ends on rods 23 which rest in bearing blocks 24 supported on transverse members 25 rigid with the wheel pieces 14, a bar 26 carried at the lower ends of the suspension rods 22 on each side of the truck, transverse rods 27 connecting the suspension rods on one side of the frame to those on the other side, and springs 28 interposed between the bolster 20 and the bars 26, these springs being seated on the members 26 and on forwardly and rearwardly extending bars 29 connecting the transverse beams 200 of the bolster 20.

The frame of the body 1 is supported on the truck bolster 20 by a body bolster center plate or fifth wheel section 31 carried by transverse front and rear rods 32 which are arranged in the front and in the rear of the axis of the truck, the ends of these rods 32 being secured at 33 to the ends of rods 34 mounted above the rods 32 and secured to the sills 2 and beams 3 of the body frame. The center bearing or fifth wheel section 31 fits into the center bearing plate or fifth wheel section 21 of the truck bolster 20 as clearly seen in Figs. 5 and 6.

35, Fig. 2, designates the internal combustion engine; and 36, the casing of a change speed gearing, the drive shaft of which is connected to the engine shaft by a suitable clutch as a friction clutch located within the casing 37, the engine and the gearing casing being rigidly mounted upon two of the beams 3, in the front compartment of the car and being arranged tandem, that is, with the main shaft of the gearing in axial alinement with the engine shaft. Hence floor space is provided on opposite sides of the engine for baggage and the mechanician attending the engine. The motor 35 may be of any suitable form, size and construction.

The change speed gearing located in the casing 36 may be of any suitable construction, and as shown in Fig. 7, is of the sliding gear selective type, and includes driving and driven elements or shafts 38, 39 arranged in axial alinement, a counter shaft 40 arranged parallel to the shaft 39, and gears on the shafts, some of the gears being shiftable.

The driving shaft 38 is supported at one end in a bearing in one end wall of the casing 36 and has a combined gear and clutch head 41 mounted within the casing. The shaft 38 is mounted at its other end in a bearing in the rear end of the engine shaft in the usual manner. The driven shaft 39 is mounted at one end in the end wall of the casing opposite to that in which the shaft 38 is mounted, and between its ends in an intermediate bearing 42 and at its end adjacent the shaft 38 in a bearing 43 located in a recess in the clutch head 41. The countershaft 40 is suitably mounted at its ends in bearings in the opposing end walls of the casing 36 and between its ends in an intermediate bearing 44. Sliding gears 45, 46 are mounted on the shaft 39 and are operable in any well known manner, into and out of mesh with gears on the counter shaft 40, the gear 45 also having a clutch face which is shifted into and out of engagement with the gear or head 41 to directly connect the driving and driven shafts 38, 39.

A terminal gear 47 is mounted on the driven shaft 39 between the ends of the gearing, this gear 47 delivering the motion of the change speed gearing.

The driven shaft 39 extends through the casing 36 at one end and is provided with a socket 48 forming one section of a universal joint, the other section of which is carried at one end of a shaft 50 connected at its other end by a universal joint 51 to a shaft 52 which is journaled in a suitable bearing on one of the beams 3. The shaft 53 is provided with a sprocket wheel which is connected by a sprocket chain 54 with a wheel on the shaft 55 of an air compressor forming part of the air brake system. The projecting end of the shaft 39 is also provided with a sprocket wheel which is connected by a belt or chain 56 to a sprocket wheel on the armature shaft of a generator 57 which is part of the lighting system of the car, said system also including a storage battery 57ª connected in circuit with the generator to receive the current therefrom. The casing 36 is preferably a one piece construction with an opening 58, Fig. 7, in its lower side through which the shafts equipped with their gears and the intermediate bearings are inserted.

The terminal gear 47 for transmitting the motion of the change speed gearing is preferably a bevel gear and is located on the shaft 39 above the opening 58 of the casing.

The clutch located within the casing 37 is released by means of a pedal 60 pivoted to one of the beams 3 and connected by a link 61 to an arm 62 mounted on a rock shaft 63 which is connected to the well known yoke member, operating the shiftable part or parts of the friction clutch located in the casing 37.

The power transmitting mechanism between the motor and the drive wheels of the truck 8, in addition to the change speed gearing in the casing 36, includes shaft sections 64, 65, Figs. 7 and 8, journaled in bearing members 66, 67 rigidly secured respectively to the body or beams 3, and to the bolster 20, means connecting the upper shaft section 64 to the gear 47 of the change speed transmission gearing, and means connecting the lower shaft section 65 to the drive wheel or wheels of the truck 8.

The bearing member 66 is here shown as bolted to the casing 36 of the change speed gearing in alinement with the opening 58, and the bearing member 67, is shown as rigidly bolted by cap screws 68 to a casing 69, rigidly carried by the spring supported bolster 20. The gear casing 36 and bearing member 66 are here shown as formed with annular flanges, Fig. 6, which are secured together by bolts 70. The motor 35, the change speed gearing and the bearing member 66 constitute a power plant unit which is rigid with the frame and has its shaft or element from which the power is transmitted, located vertically between the ends of the unit, (that is between the front end of the engine and the rear end of the gear casing), and substantially coaxially with the vertical axis of the contiguous truck. The foregoing arrangement places the combined weight of the power plant unit on opposite sides of the vertical axis of the truck.

The bearing members 66, 67 preferably telescope at their opposing ends, and are usually connected by a joint having ball-and-socket and swivel actions. As here shown, the member 67 is formed with a socket 71, and the member 66 with a spherically curved external surface 72 in said socket.

The shaft section 64 which is journaled in the bearing member 66, carries at its upper end a bevel gear 73 meshing with the bevel terminal gear 47 of the change speed gearing. Suitable anti-friction bearings 74, 75 are located in the bearing member 66, the bearing 75 being also constructed to take the end thrust of the shaft section 64.

The lower shaft section 65, Figs. 7 and 8, is provided at its lower end with suitable motion transmitting means. As here shown, it is provided with a bevel gear 76 which meshes with one or the other of a pair of bevel gears 77, 78 mounted on a shaft 79, Fig. 9, journaled in the casing 69. Suitable anti-friction bearings 80, 81 are interposed between the bearing member 67 and the shaft section 65, the lower bearing 80 serving to take the end thrust of the shaft 65.

The center bearing or fifth wheel sections 21, 31 surround the parts 66, 67, are substantially coaxial therewith, and relieve them of any endwise pressure.

The opposing ends of the shaft sections 64, 65 are connected by a universal joint, these shaft sections being illustrated as provided at said ends with teeth 82, 83 resembling gear teeth, and an internal toothed collar 84 encircling the gear teeth 72, 73 with its teeth loosely in mesh with the teeth 82, 83. Hence during relative rocking movement of the car body 1 and the bolster 20, the shaft sections can move relatively to each other.

The casing 69, in which the shaft 79 is journaled is here shown as formed of duplicate sections which are secured together by bolts 85, Figs. 6 and 9, the sections being provided with hubs 87 in which the anti-friction members for the shaft 79 are located. This casing 69 is rigidly supported by hangers or brackets 88, Figs. 2, 4, 5, and 6, which are secured at their upper ends to the bolster 20 and carry at their lower ends integral bearings or collars 89 in which the hubs 87 are held.

The gears 77, 78 are respectively provided with hubs 90, 91 formed with suitable annular flanges secured to the gears by rivets, or other means. The hub 90 of the gear 77 is longer than the hub 91 of the gear 78, and the hub 91 is mounted upon the hub 90 with its inner end opposed to an annular shoulder 92 on the hub 90, the edge of the hub 90 together with the shoulder 92 forming the opposite sides of an annular groove along which are placed bearing rings 93, 94, Fig. 9, having opposing conical faces. A nut 95 holds the hub 91 on the hub 90.

The gears 77, 78 are shiftable axially as a unit to carry one or the other into and out of mesh with the bevel gear 76, by shifting means coacting with the rings 93, 94. The form of shifting means illustrated, comprises a rotatable sleeve or element 96 journaled in a suitable bearing 97 held between the sections of the casing 69, and an eccentrically mounted spindle 98 rotatable in bearings 99 at opposite ends of the sleeve 96, and having means, as a conical roller 100, at its inner end engaging the bearing rings 93, 94. This spindle 98 is held in the sleeve 96 in any suitable manner and is journaled in conical bearings 99 which receive the end thrust of the spindle 98. The upper end of the sleeve 96 is closed by a cap 102.

Upon a half rotation of the sleeve 96, the spindle 98, being eccentrically mounted, will shift the gears 77, 78 in one direction or the other, carrying one out of mesh with the gear 76 and the other into mesh therewith, or upon a quarter turn of the sleeve 96 the gear in mesh will be moved out of mesh, but the other gear will not be moved far enough to engage with the gear 76.

The sleeve 96 is rotated or oscillated in any suitable manner, by an operating member mounted on the car body 1, and flexible and extensible connections between said operating member and the sleeve 96.

As here shown, said means includes a lever 103, Fig. 2, mounted on a rock shaft supported by the frame of the body 1, a bevel gear 104 mounted on a rock shaft 105, and shaft sections 106, 107, 108. The section 106 is journaled in a bearing 109 carried by the car body frame and is provided with a bevel pinion 110 meshing with the bevel gear 104. The shaft sections 107 and 108 are connected together by an extensible joint, the section 107 being provided with a socket and the section 108 being slidably keyed in the socket. The section 108 is connected by a universal joint 111 to ears 112, Figs. 2, 10 and 11, provided on the cap 102 of the sleeve 96. The lever 103 is located close to the pedal 60 which operates the friction clutch between the engine and the change speed gearing.

Obviously, upon rocking of the lever 103 the sleeve 96 will be turned, and the gears 77, 78 shifted as described, and this shifting is accomplished irrespective of the angle to which the truck is turned and of any relative rocking movement of the truck and the car body.

As best seen in Figs. 10 and 11, the gears 77, 78 are locked in the position to which they are shifted, by means supported by the casing 69 in contradistinction to means located remote from the gears. As here shown, said locking means is carried by the bearing 97 and the sleeve 96, and comprises spring pressed puppets or plungers 113 movable in suitable guides in the bearing 97 and having ratchet teeth 114 at their ends, and an arm 115 rigid with the cap of the sleeve 96 and projecting laterally from one of the lugs or ears 112, this arm coacting with the teeth of the plungers 113.

The shaft 79 extends at one end beyond the hub 87 of the casing 69 and has provided thereon two driving gear wheels 116, 117 which are connected by flexbile connections to the front and rear axles 12, 13 of the truck 8. As here shown, the wheels 116, 117 are sprockets and are connected to the axles by sprocket chains 118, 119 which run over complemental sprocket wheels 120 on the axles 12, 13, Fig. 2.

The sprocket wheels 116, 117 are here shown as located contiguous to each other on one end of the shaft 79 and as formed integral, that is, they have a hub in common.

Owing to the fact that the power is transferred both forwardly and rearwardly from one end of the shaft 79, the bearing in the hub 87 adjacent to the sprocket wheels 116, 117, which bearing is subjected to most of the strain of transmitting the power, is relieved of unequal strain. In order to locate the bearing as closely as possible to the sprockets 116, 117 the hub 87 adjacent the wheels 116, 117 extends into a recess in the wheel 116.

In order to tighten or loosen the sprocket chains, the pedestals 15 are adjustable lengthwise of the side bars or wheel pieces 14 as previously explained.

The cooling system for the internal combustion engine, comprises a radiator preferably mounted on the roof of the car, a radiator suspended below the frame of the car, a storage tank in series with and between the radiators, the first mentioned radiator being not necessarily located on the roof of the car but only at a sufficient height to permit the water therein to drain by gravity to the storage tank. Suitable valves are provided for cutting in or out of the system, either one of the radiators and a car heating radiator. In this embodiment of our invention the system is shown as double and with branches on opposite sides of the car.

121, 122 are storage tanks located in the hollow partition or bulk head 4 on opposite sides of the door way 5; 123, 124 are radiator units mounted on the roof of the car; and 125 is the return pipe from the jackets of the engine cylinders. The return pipe 125 is connected at 126, Fig. 13, to a transversely extending pipe 127 located below the bulk head or partition 4 and having at its opposite ends upwardly extending pipes 128, 129 which are within the partition 4 and are connected respectively by horizontal pipes 130, 131, to the opposite ends of the radiator units 123, 124. Said radiator units 123, 124 are connected by return pipes 132, 133 to the tanks 121, 122 respectively, and these tanks are connected at their lower ends by a pipe 134.

The storage tanks 121, 122 are provided with upright pipes 135, 136 through which they may be filled from an outside source. Each pipe 135, 136 is connected by a pipe 137 provided with a valve 138 to the companion upright pipe 128 or 129 which leads to one or the other of the radiator units 123, 124 on the roof. When the valves 138 are closed, the cooling medium must pass up the pipes 128, 129 to the radiator units 123, 124, but when these valves are open the water will return or short circuit to the storage tanks through the pipes 137 from the upright pipes 128, 129 leading to the radiator units 123, 124. The return of the water from the tanks 121, 122 to the engine jackets will be described in connection with the lower radiator and the heating system.

Each radiator unit 123, 124 includes a main upright head 139, a transfer upright head 140, transverse pipes 141, 142 connecting the heads and through which the water flows in opposite directions, and intermediate supports 143, Fig. 1. The radiator units are reversely arranged with respect to each other so that the main head 139 of one unit is located on one side of the car and contiguous to the transfer head 140 of the other radiator unit, and the main head 139 of one radiator unit and the transfer head 140 of the other unit are connected by a drain passage 144.

The main head 139 of each radiator unit is divided by a partition 145 located about midway between the upper and lower ends thereof, and provided with a small drain passage 146. This passage 146 is not large enough to permit an appreciable flow therethrough in the normal circulation of the water, and consequently when circulating, the water flows from the pipes 130, 131 into the upper halves of the main heads 139 of the radiator units, and thence through the transverse pipes 141 which are located above the partitions 145, to the transfer heads 140 and through the pipes 142 which are located below the partitions 145, to the lower halves of the main heads 139. The partitions 145 thus cause the water to circulate through the pipes 141, 142. If, however, the engine is stopped, so that the water is not circulated, then it will drain downwardly through the passages 146 of the partitions 145 and through one or the other of the drain pipes 144 to the contiguous head 139 and back through one or the other or both of the return pipes 132, 133. Thus owing to the opposite arrangement of the radiator units and to the drain passages 144, 146, all of the water can drain out of the radiator units, and this draining will take place irrespective of the angle or direction the car is leaning, as the draining will take place through the return pipe 132 if the car is leaning in one direction, and through the other drain pipe 133 if the car is leaning in the other direction.

The storage tanks 121, 122 are of sufficient capacity to contain all the water of the entire system. The radiator units 123, 124 on the roof of the car are usually used only in colder weather and, consequently, it is important that these units drain automatically.

147 designates the radiator located below the car body and suspended therefrom. This radiator consists of two like units and is connected in the water cooling system by a pipe 148 connected at one end to the pipe 134 previously described, and at its other end to the transversely extending pipe 149 to opposite end portions of which are connected pipes 150, 151 discharging into the tops of the units of the radiator 147. The bottoms of the units of the radiator 147 are connected by pipes 152, 153 to the transverse pipe 154 having an intermediate portion thereof connected to a return pipe 155 leading to the engine jackets. The pipes 150, 151 are provided with valves of any suitable construction 156, 157, 158, 159 by means of which the flow of the cooling medium is controlled through the heating system and through the radiator 147 and by means of which the heating system and the lower radiator 147 may be cut out.

When both the heating system and the radiator 147 are cut out, the water passes from the pipe 134 through the pipe 148, and the transverse pipe 149 to the valves 156, 158 which are now positioned to cut out the heating coils 160, 161 and to conduct the water into the pipes 150, 151 to the valves 157, 159 which are then turned to cut out the remaining portions of the pipes 150, 151 connected to the radiator 147, and to permit the water to flow through part of the length of a pipe 162 to valves 163, 163ª therein, and thence through pipe sections 164, 165 to the pipe 154 to which the return pipe 155 to the engine is connected. When both the heating system and the lower radiator 147 are cut out, as described, the valves 167, 168 in the pipes 152, 153 leading from the radiator 147 are closed.

The heating coils 160, 161 previously mentioned, are of any suitable form, size and construction and extend along opposite sides of the car body.

Usually in colder weather the water is circulated through the upper radiator units 123, 124 and then through the heating coils 160, 161. After passing through the radiator units 123, 124 the water flows to the tanks 121, 122 and thence through the pipe 134, the pipe 148, and laterally in opposite directions in the transverse pipe 149 and through the valves 156, 158 which are now in position to permit the passage of the water to the upright pipes 169, 170 at the ends of said pipe 149. The water then flows from the pipes 169, 170 through the coils 160, 161, the return upright pipes 171, 172 the transverse pipe 162, the valves 163, 163ª in said pipe 162, and thence downwardly to the pipe 154 to the return pipe 155 and to the engine jacket. During the flow of the cooling water through the path last described the valves 157, 159, 167, 168 are turned to cut out the radiator 147.

It thus appears that to cut out the heating system, the valves 156, 157, 158, 159 are operated; and that to cut out the lower radiator 147 and not the heating system the two valves 156, 158 are operated to open the pipe 149 to the ends thereof and to close pipes 150, 151 leading to the lower radiator, the valves 157, 159 are also operated to close the feed pipes 150, 151 to the radiator 147, and the valves 167, 168 in the return pipes 152, 153 are closed.

In case the upper radiator is cut out and the lower radiator used, the valves 138 located above the tanks 121, 122, Fig. 12, are turned to short circuit the upper radiator units 123, 124 so that the water flows through the pipe 134 connecting the lower ends of the tanks 121, 122 through the pipe 138 to the heating system and the lower radiator 147 as previously described.

A suitable circulating pump 173 is used to lift the water to the upper radiator units 123, 124, and a pump may be also used to take the water out of the lower radiator 147, or a drain cock may be provided for this purpose.

By the use of radiators on the roof and on the floor of the car ample cooling surface is provided for the cooling medium in warm weather, and this surface can be cut down to a smaller amount in colder weather.

This cooling system is highly advantageous in that provision is made in a particularly simple and economical manner for heating the car by the engine cooling medium.

174, 175 are tanks of the fuel system, these being arranged in the bulk head or hollow partition 4 on opposite sides of the door way 5, and contiguous to the tanks 121, 122 which, when the car is running, maintain the tanks 174, 175 at a temperature substantially uniform and above that of the atmosphere. Pipes 176, 177 connect the tanks to the carbureter 178 of the engine, these pipes passing out through the open bottom of the hollow partition 4.

This motor car is particularly advantageous in that the motor, change speed gearing, air compressor, and generator, are all supported in comparatively close relation to each other and extend in a direction lengthwise of the car body, so that the parts requiring the attention of an operator are grouped together in a comparatively small space, and are so arranged relatively to each other and contiguous parts of the car that ample space is provided on opposite sides of the car body for the attendant, and for baggage, and the power is transmitted to the wheels of the truck by mechanism, the operation of which is not affected by turning of the truck, or by relative rocking movement of the car and the truck. Also, the power plant and all the transmission mechanism, including that on the truck, are carried by the spring supported parts of the vehicle as for instance, by the car body or by the truck bolster which in turn supports the car body.

Furthermore, in our motor car, owing to the arrangement of the motor, change speed gearing, electric generator, air compressor and the power transmitting mechanism between the change speed gearing and the wheels of the truck, the generator 57 and the air compressor can be actuated from the truck wheels through the transmission mechanism when the car is coasting. The power required during coasting to run the generator and the air compressor is thus utilized as a braking force.

During this operation, the motor 35 may be disconnected from the transmission gearing by operating the pedal 60 or by shifting the gear 45 of the change speed transmission gearing to neutral position.

If additional braking action is required the motive fluid for the engine may be cut off without disengaging the main clutch in the casing 37 so that the engine is dead and is operated from the truck. Of course, the car is provided with the usual brakes. If the engine is disconnected from the change speed gearing and is not kept running under its own power, it can be started when the car is approaching the end of a downgrade by engaging said main clutch so that the engine is temporarily actuated by the power taken from the truck.

As will be obvious to those skilled in the art, the engine may be equipped with an air starting device connected to the air compressor, and the air pumped in the compressor during coasting may be utilized to start the engine.

This motor car is further advantageous in that by reason of the change speed gearing and the reversing gearing any desired speed forward and rearward can be obtained.

What we claim is:

1. In a motor car, the combination of a car body, a truck supporting the body and movable about a vertical axis relatively thereto, a multicylinder engine extending lengthwise of the body, and a change speed gearing connected between the engine and a wheel of the truck, and including a portion carried by the body in line with the engine, and a vertical portion connected to a wheel of the truck, substantially as and for the purpose described.

2. In a motor car, the combination of a car body, a truck supporting the body and movable about a vertical axis relatively thereto, a multicylinder engine extending lengthwise of the body, and a change speed gearing connected between the engine and a wheel of the truck and including a portion carried by the body in line with the engine, and a vertical portion arranged coaxially with the vertical axis of the truck, and connected to a wheel of the truck, substantially as and for the purpose specified.

3. In a railway motor car, the combination of a car body having a chamber open at its bottom to the exterior of the car body, an internal combustion motor, and a motor cooling system including a storage tank supported in the chamber, substantially as and for the purpose set forth.

4. In a railway motor car, the combination of a car body having a chamber open at its bottom to the exterior of the car body, an internal combustion motor, and a fuel tank supported in the chamber and connected to the motor, substantially as and for the purpose described.

5. In a railway motor car, the combination of a car body having a chamber open at its bottom to the exterior of the car body, an internal combustion motor, a motor cooling system including a storage tank supported in the chamber, and a fuel tank also supported in the chamber and connected to the motor, substantially as and for the purpose specified.

6. In a railway motor car, the combination of a car body having a chamber open at its bottom to the exterior of the car body, an internal combustion motor, and a motor cooling system including a storage tank supported in the chamber, and a pipe communicating with the storage tank and extending through the open bottom portion of the chamber, substantially as and for the purpose set forth.

7. In a railway motor car, the combination of a car body having a chamber open at its bottom to the exterior of the car body, an internal combustion motor, a fuel tank supported in the chamber, and a pipe leading through the open bottom portion of the chamber and communicating with the fuel tank and the motor, substantially as and for the purpose described.

8. In a railway motor car, the combination of a car body having a chamber open at its bottom to the exterior of the car body, an internal combustion motor, a motor cooling system including a storage tank supported in the chamber, and a pipe communicating with the storage tank and extending through the open bottom portion of the chamber, a fuel tank also supported in the chamber, and a pipe leading through said open bottom portion of the chamber and communicating with the fuel tank and the motor, substantially as and for the purpose specified.

9. In a railway motor car, the combination of a car body having a transverse hollow partition dividing the body into two compartments, an internal combustion motor located in one compartment, and a motor cooling system including a storage tank supported in the partition, substantially as and for the purpose set forth.

10. In a railway motor car, the combination of a car body having a transverse hollow partition dividing the body into two compartments, an internal combustion motor located in one compartment, a motor cooling system including a storage tank supported in the partition, and a fuel tank supported in said partition contiguous to the storage tank and connected to the motor, substantially as and for the purpose described.

11. In a railway motor car, the combination of a car body having a transverse hollow partition dividing the body into two compartments, the partition being open at its bottom to the exterior of the car body, an internal combustion motor located in one compartment, and a motor cooling system including a storage tank supported in the partition and accessible through the open bottom portion thereof, substantially as and for the purpose specified.

12. In a railway motor car, the combination of a car body having a transverse hollow partition dividing the body into two compartments, the partition being open at its bottom to the exterior of the car body, an internal combustion motor located in one compartment, a motor cooling system including a storage tank supported in the partition, and a pipe communicating with the storage tank and extending through the open bottom portion of the partition, a fuel tank also supported in the partition, and a pipe leading through said open bottom portion of the partition and communicating with the fuel tank and the motor, substantially as and for the purpose set forth.

13. In a railway motor car, the combination of a car body having a transverse hollow partition dividing the body into two compartments, the partition being provided with a door, an internal combustion motor located in one compartment, and a motor cooling system including a storage tank supported in the partition at one side of the door, substantially as and for the purpose specified.

14. In a railway motor car, the combination of a car body having a transverse hollow partition dividing the body into two compartments, the partition being provided with a door, an internal combustion motor located in one compartment, and a motor cooling system including storage tanks supported in the partition at opposite sides of the door, substantially as and for the purpose set forth.

15. In a railway motor car, the combination of a car body having a transverse hollow partition dividing the body into two compartments, the partition being provided with a door, an internal combustion motor located in one compartment, and fuel tanks supported in the partition on opposite sides of the door and communicating with the motor, substantially as and for the purpose described.

16. In a railway motor car, the combination of a car body having a transverse hollow partition dividing the body into two compartments, the partition being provided with a door, an internal combustion motor located in one compartment, and a storage tank for a motor cooling medium, and a fuel tank located in the partition on opposite sides of the door, substantially as and for the purpose specified.

17. In a railway motor car, the combination of a car body having a transverse hollow partition dividing the body into two compartments, the partition being provided with a door, an internal combustion motor located in one compartment, and a storage tank for a motor cooling system and a fuel tank located in said partition on each side of the door whereby when the motor is in operation, the fuel is heated by the circulating cooling medium, substantially as and for the purpose set forth.

18. In a railway motor car, the combination of a car body, having a transverse hollow partition dividing the body into two compartments, the partition being provided with a door and the partition being open at its bottom to the exterior of the car body on opposite sides of the door; an internal combustion motor located in one compartment, a cooling system including an element located within the hollow partition at one side of the door, a fuel tank for the motor located in the partition at the other side of the door, and pipes leading from said element and fuel tank through the open lower portions of the partition, substantially as and for the purpose described.

19. In a railway motor car, the combination of a car body having a transverse hollow partition dividing the body into two compartments, the partition being provided with a door and the partition being open at its bottom to the exterior of the car body on opposite sides of the door, an internal combustion motor located in one compartment, a cooling system including storage tanks located within the hollow partition at opposite sides of the door, pipes communicating with the storage tanks and extending through the open bottom portions of the partition, fuel tanks for the motor also located in the partition, at opposite sides of the door, the fuel tanks being arranged contiguous to the storage tanks, and pipes leading from the fuel tanks through said open bottom portions of the partition and communicating with the motor, substantially as and for the purpose specified.

20. In a motor vehicle, the combination of a body, a truck turnable about a vertical axis, a motor supported by the body, and mechanical power transmitting mechanism connected between the motor and one of the wheels of the truck and including a portion extending vertically from the body to the truck and substantially coincident with said axis and including a universal joint between the body and the truck, substantially as and for the purpose specified.

21. In a motor vehicle, the combination of a body, a truck including front and rear wheels, a motor supported by the body, and mechanical power transmitting mechanism connected between the motor and one of the wheels of the truck and comprising shaft sections extending vertically at a point between the axes of the front and rear wheels and carried by the body and the truck respectively, the shaft sections having peripheral gear teeth at their opposing ends, and an internal toothed ring encircling and meshing with the gear teeth of the shaft sections, substantially as and for the purpose described.

22. In a motor vehicle, the combination of a body, a truck, a motor supported by the body, and mechanical power transmitting mechanism connected between the motor and one of the wheels of the truck and comprising a vertical bearing member rigid with the body, a vertical bearing member rigid with the truck bolster, in alinement with the former bearing member, the bearing members being connected by a joint for permitting relative movement of said members, and power transmitting means within the bearing members and including shaft sections located in said members respectively and coupled together by a flexible coupling, substantially as and for the purpose specified.

23. In a motor vehicle, the combination of a body, a truck, a motor supported by the body, and mechanical power transmitting mechanism connected between the motor and one of the wheels of the truck and comprising a vertical bearing member rigid with the body, a vertical bearing member rigid with the truck bolster in alinement with the former bearing member, the bearing members being connected by a joint for permitting relative movement of said members, and shaft sections journaled in the bearing members respectively and connected by a joint for permitting relative movement of said shaft sections, substantially as and for the purpose set forth.

24. In a motor vehicle, the combination of a body, a truck, a motor supported by the body, and mechanical power transmitting mechanism connected between the motor and one of the wheels of the truck and comprising a vertical bearing member rigid with the body, a vertical bearing member rigid with the truck bolster in alinement with the former bearing member, the bearing members being connected by a joint for permitting relative movement of said members, shaft sections journaled in the bearing members respectively and connected by a joint for permitting relative movement of said shaft sections, and means in each bearing member for resisting the end thrust of the shaft section journaled therein, substantially as and for the purpose described.

25. In a motor vehicle, the combination of a body, a truck movable about a vertical axis, a motor supported by the body, and mechanical power transmitting mechanism between the motor and one of the wheels of the truck, a portion of the mechanism extending substantially vertically and concentric with said vertical axis and including bearing members rigid with the body and the truck respectively, and connected by a joint having a rocking and a swivel action, and shaft sections journaled in the bearing members respectively and connected by a joint having a rocking action, substantially as and for the purpose described.

26. In a motor vehicle, the combination of a body, a truck, a motor supported by the body, and mechanical power transmitting mechanism connected between the motor and one of the wheels of the truck, and including transmission gearing comprising driving and driven shafts, gears on the shafts, and a terminal driven gear located between the ends of the driving and driven shafts and between gears thereon, substantially as and for the purpose specified.

27. In a motor vehicle, the combination of a body, a truck, and a power plant unit comprising a motor supported by the body, and power transmitting mechanism between the motor and one of the wheels of the truck including a change speed gearing carried by the body, the gearing being arranged with its driving and driven shafts in line with the engine shaft, and an upright shaft for receiving power from the gearing, said shaft being arranged at an angle to the driven shaft of the gearing between the ends of the power plant unit whereby the combined weight of the gearing and the engine are on opposite sides of the axis of the upright shaft, substantially as and for the purpose described.

28. In a motor vehicle, the combination of a body, a truck movable about a vertical axis, a motor supported by the body, and power transmitting means connected between the motor and a wheel of the truck and comprising a gear arranged substantially coaxially with said axis and a change speed gearing between the motor and said gear, substantially as and for the purpose specified.

29. In a motor vehicle, the combination of a body, a truck movable about a vertical axis, a motor supported by the body, and power transmitting means connected between the motor and a wheel of the truck and comprising a gear arranged substantially coaxially with said axis, and a change speed gearing between the motor and said gear, the axis of said gear extending between the ends of the transmission gearing, substantially as and for the purpose set forth.

30. In a motor vehicle, the combination of a body, a truck including a spring supported bolster, a motor carried by the body, and mechanical power transmitting mechanism connected between the motor and one of the wheels of the truck and including a portion carried by the spring supported bolster, and connections between said portion and said one of the wheels, substantially as and for the purpose described.

31. In a motor vehicle, the combination of a body, a truck including a spring supported bolster, a motor carried by the body, and mechanical power transmitting mechanism connected between the motor and one of the wheels of the truck, and comprising a portion carried by the body at substantially the vertical central line of the truck, and a portion carried by the spring supported bolster, said portions being connected together by a universal joint, substantially as and for the purpose specified.

32. In a motor vehicle, the combination of a body, a truck movable about a vertical axis and including a spring supported bolster, a motor carried by the body, and power transmitting mechanism connected between the motor and one of the wheels of the truck and comprising bearing members concentric with the vertical axis of the truck, one member being rigid with the body and the other with the spring supported bolster, said bearing members being connected by a universal and swivel joint, shaft sections journaled in the bearing members respectively, and connected by a universal joint, and connections between the lower shaft section and said one of the wheels of the truck, substantially as and for the purpose set forth.

33. In a motor vehicle, the combination of a body, a truck including front and rear wheels having axles, journal boxes on the axles, a frame having pedestals for receiving the journal boxes, equalizing bars located below the frame and having their ends resting on said boxes, springs interposed between the frame and the equalizing bars, a bolster yieldingly supported by the frame, and power transmitting mechanism connected between the motor and one of the wheels of the truck and comprising a bearing member rigid with the body, a bearing member rigid with the bolster, said members being arranged vertically at substantially the center of the truck frame, and jointed shaft sections journaled in the bearing members respectively, substantially as and for purpose described.

34. In a motor vehicle, the combination of a body, a truck supporting the body and movable about a vertical axis, center plates carried respectively by the body and the truck, the center plates being formed with openings, a motor carried by the body, and power transmitting means connected between the motor and a wheel of the truck and comprising parts extending through the openings of the center plates and connected together by a universal joint at a point substantially concentric with said plates, substantially as and for the purpose specified.

35. In a motor vehicle, the combination of a body, a truck supporting the body and movable about a vertical axis, center plates carried respectively by the body and the truck, the center plates being formed with openings, a motor carried by the body, and power transmitting means connected between the motor and a wheel of the truck and comprising jointed shafts extending through the openings in the center plates and carried by the body and the truck respectively, said shafts being connected by a universal joint, substantially as and for the purpose set forth.

36. In a motor vehicle, the combination of a body, a truck supporting the body and movable about a vertical axis, center plates carried respectively by the body and the truck, and formed with substantially central openings, a motor supported by the body, and mechanical power transmitting mechanism connected between the motor and a wheel of the truck and comprising bearing members extending through the openings in the center plates and rigid with the body and the truck respectively, jointed shaft sections journaled in the bearing members, respectively, and connections between the lower shaft section and said one of the truck wheels, substantially as and for the purpose described.

37. In a motor vehicle, the combination of a body, a truck including a bolster, a motor carried by the body, power transmitting mechanism connected between the motor and one of the wheels of the truck, and a member fixed to the bolster and supporting a portion of said mechanism, substantially as and for the purpose specified.

38. In a motor vehicle, the combination of a body, a truck including a bolster, a motor carried by the body, power transmitting mechanism connected between the motor and one of the wheels of the truck and including a case having spaced apart bearing surfaces, and spaced apart members fixed to the bolster and provided with eyes for receiving said bearing surfaces, substantially as and for the purpose set forth.

39. In a motor vehicle, the combination of a body, a truck including a spring supported bolster, a supporting member carried by the bolster, a motor carried by the body, and power transmitting mechanism connected between the motor and one of the wheels of the truck and including a portion supported by the member, substantially as and for the purpose described.

40. In a motor vehicle, the combination of a body, a truck including a spring supported bolster, a pair of spaced apart supporting members depending from the bolster and provided with eyes, a motor carried by the body, and power transmitting means connected between the motor and one of the wheels of the truck and including a case having spaced apart bearing surfaces supported in the eyes of said members, substantially as and for the purpose specified.

41. In a motor vehicle, the combination of a body, a truck including a bolster, a center plate on the bolster, a motor carried by the body, power transmitting mechanism connected between the motor and one of the wheels of the truck, and a supporting member depending from the bolster and supporting a portion of said mechanism, substantially as and for the purpose set forth.

42. In a motor vehicle, the combination of a body, a truck including a bolster, a supporting member carried by the bolster, a motor supported by the body, power transmitting mechanism connected between the motor and one of the wheels of the truck and comprising a vertical bearing member rigid with the body, a second vertical bearing member carried by said supporting member in alinement with the former bearing member, the bearing members being connected by a joint for permitting relative movement of said members, and power transmitting means within the bearing members, substantially as and for the purpose described.

43. In a motor vehicle, the combination of a body, a truck including a spring supported bolster, a center plate on the bolster, a pair of spaced apart supporting members depending from the bolster and formed with eyes at their lower ends, a motor supported by the body, and power transmitting mechanism connected between the motor and one of the wheels of the truck and comprising a vertical bearing member rigid with the body and a vertical bearing member mounted in the eyes and carried in alinement with the former bearing member, the bearing members being connected by a joint for permitting relative movement of said members, and shaft sections journaled in the bearing members respectively, and connected by a joint for permitting relative movement of the said shaft sections, substantially as and for the purpose specified.

44. In a motor vehicle, the combination of a body, a truck, a motor carried by the body, power transmitting mechanism connected between the motor and one of the wheels of the truck and comprising a shiftable member carried by the truck, and means for operating said shiftable member, comprising a member carried by the body, and extensible connections including a universal joint between the operating member and the shiftable member, substantially as and for the purpose specified.

45. In a motor vehicle, the combination of a body, a truck, the truck and body having relative movement about a vertical axis, a motor carried by the body, power transmitting mechanism connected between the motor and one of the wheels of the truck and including a change speed gearing carried by the body, and reversing gearing carried by the truck and including a shiftable member, and means for operating the shiftable member including a member carried by the body, substantially as and for the purpose set forth.

46. In a motor vehicle, the combination of a body, a truck, a motor carried by the body, power transmitting mechanism connected between the motor and one of the wheels of the truck and including a change speed gearing carried by the body, and reversing gearing carried by the truck and including a shiftable member, and means for operating the shiftable member comprising a member carried by the body, and extensible connections between said members including a universal joint, substantially as and for the purpose described.

47. In a motor vehicle, the combination of a motor, a drive wheel, power transmitting connections between the motor and the drive wheel comprising a shiftable member, and means for shifting said member comprising an eccentric, and means for moving the eccentric about its axis, substantially as and for the purpose specified.

48. In a motor vehicle, the combination of a motor, a drive wheel, power transmitting connections between the motor and the drive wheel comprising a shiftable member, a rotatable sleeve, a spindle eccentrically journaled in the sleeve and having means at one end coacting with the shiftable member, and means for rotating the sleeve, substantially as and for the purpose set forth.

49. In a motor vehicle, the combination of a motor, a drive wheel, power transmitting connections between the motor and the drive wheel comprising a shiftable member having an annular groove, a rotatable sleeve, and a spindle eccentrically journaled in the sleeve and having a roller at one end fitting in the groove, and means for rotating the sleeve, substantially as and for the purpose described.

50. In a motor vehicle, the combination of a truck including a spring supported bolster, and power transmitting mechanism comprising a driving wheel carried by the bolster, and flexible connections between the driving wheel and one of the wheels of the truck, substantially as and for the purpose set forth.

51. In a motor vehicle, the combination of a truck including a spring supported bolster, and power transmitting mechanism comprising a driving wheel carried by the bolster, a driven wheel associated with one of the wheels of the truck, and a belt running over the driving and driven wheels, substantially as and for the purpose described.

52. In a motor vehicle, the combination of a truck including front and rear wheels and a spring supported bolster, and power transmitting mechanism comprising driving wheels carried by the bolster between the front and rear wheels of the truck, and flexible connections between said driving wheels and front and rear wheels, substantially as and for the purpose described.

53. In a motor vehicle, the combination of a truck including front and rear wheels and a spring supported bolster, and power transmitting mechanism comprising driving wheels carried by the bolster between the front and rear wheels of the truck with their axes substantially in the plane of the axes of the truck wheels, and flexible connections between said driving wheels and the front and rear wheels of the truck, substantially as and for the purpose specified.

54. In a motor vehicle, the combination of a truck including front and rear wheels and a spring supported bolster, and power transmitting mechanism comprising driving wheels carried by the bolster between the front and rear wheels of the truck with their axes substantially in the plane of the axes of the truck wheels, driven wheels revoluble with the truck wheels, and belts running over the driving and driven wheels, substantially as and for the purpose set forth.

55. In a motor vehicle, the combination of a body, a truck including a spring supported bolster, a motor carried by the body, and power transmitting mechanism including a driving wheel carried by the bolster, a driven wheel associated with one of the wheels of the truck, and a belt running over the driving and driven wheels, substantially as and for the purpose described.

56. In a motor vehicle, the combination of a body, a truck including a spring supported bolster, a center plate on the bolster, a depending supporting member carried by the bolster, and power transmitting mechanism including a driving wheel carried by the depending supporting member, and flexible connections between the drivng wheel and one of the wheels of the truck, substantially as and for the purpose specified.

57. In a motor vehicle, the combination of a body, a truck, a power plant unit fixed to the body and including an internal combustion engine, change speed transmission gearing, a bearing member extending vertically from the body, and a shaft section journaled in the bearing member, a power transmitting unit fixed to the bolster of the truck and including a bearing member, a shaft section in the latter bearing member flexibly connected to the former shaft section, a gear casing rigid with the latter bearing member, and gearing in the casing connected to the latter shaft section, and connections from the gearing to one of the wheels of the truck, substantially as and for the purpose set forth.

58. In a motor vehicle, the combination of a body, a truck, a power plant unit fixed to the body and including an internal combustion engine, change speed transmisson gearing, a bearing member extending vertically from the body, and a shaft section journaled in the bearing member, a power transmitting unit fixed to the bolster of the truck and including a bearing member, a shaft section in the latter bearing member flexibly connected to the former shaft section, a casing rigid with the latter bearing member, and gearing in the casing connected to the latter shaft section and including reversing means, and connections from the gearing to one of the wheels of the truck for rotating said wheel in reverse directions, substantially as and for the purpose described.

59. In a motor vehicle, the combination of a body, a truck having front and rear wheels, a power plant unit fixed to the body and including an internal combustion engine, change speed transmission gearing, a bearing member extending vertically from the body at substantially the center line of the truck, and a shaft section journaled in the bearing member, a power transmitting unit fixed to the bolster of the truck and including a bearing member connected to the former bearing member by a swivel and universal joint, a shaft section in the latter bearing member, connected to the former shaft section by a universal joint, a casing rigid with the latter bearing member, and gearing located in the casing and connected to the latter shaft section and including reversing means, and means for connecting the gearing in the casing to one of the wheels of the truck, substantially as and for the purpose specified.

60. In a motor vehicle, the combination of a body, a truck movable about a vertical axis and including front and rear wheels and a spring supported bolster, a power plant unit fixed to the body and including an internal combustion engine, a change speed gearing including a casing, a bearing member rigid with the casing of the change speed gearing, and a shaft section journaled in the bearing member and connected to a gear of the change speed gearing, a bearing member rigid with the bolster, a shaft section located in the latter bearing member in alinement with the former shaft section, the shaft sections being connected by a universal joint, a gear casing supported by the bolster and rigid with the second named bearing member, gearing in the last-mentioned casing including reversing means, means for connecting the last named gearing to the front and rear wheels of the truck, and means for operating the reversing means including an operating member carried by the body and flexible and extensible connections between the operating member and the reversing means, substantially as and for the purpose set forth.

61. In a motor vehicle, the combination of a body, a truck including a spring supported bolster, and a pair of spaced apart brackets carried by the bolster, a motor carried by the body, and power transmitting mechanism between the motor and one of the wheels of the truck including a vertical bearing member rigid with the body, a casing supported by the brackets, a bearing member extending upwardly from the casing, shaft sections journaled in the bearing members respectively and connected by a universal joint, and means connecting the lower shaft section and one of the wheels of the truck, a portion of said means being supported by the casing, substantially as and for the purpose described.

62. In a motor vehicle, the combination of a body, a truck including a spring supported bolster, and a pair of spaced apart brackets carried by the bolster, a motor carried by the body, a casing having hubs supported by the brackets, and power transmitting mechanism between the motor and one of the wheels of the truck including coacting elements supported by the body and the bolster respectively, a shaft journaled in the hubs and extending outside of the casing, and means for connecting the shaft to one of the coacting elements and to one of the wheels of the truck, substantially as and for the purpose specified.

63. In a motor vehicle, the combination of a body, a truck including a spring supported bolster and a pair of spaced apart brackets carried by the bolster, a motor carried by the body, and power transmitting mechanism between the motor and one of the wheels of the truck including a vertical bearing member rigid with the body, a casing having hubs supported by the brackets, a bearing member extending upwardly from the casing, shaft sections journaled in the bearing members respectively and connected by a universal joint, a shaft journaled in the hubs and extending outside of the casing, and means connecting the shaft and one of the wheels of the truck, substantially as and for the purpose set forth.

64. In a motor vehicle, the combination of a body, a truck including a spring supported bolster, a motor supported by the body, power transmitting mechanism between the motor and one of the wheels of the truck comprising a horizontal shaft carried by the spring supported bolster and having a pair of axially shiftable gears thereon, a shaft carried by the bolster and having a gear for meshing with one or the other of the former gears, means connecting the second named shaft to the motor, and means for connecting the horizontal shaft to one of the truck wheels, and means for shifting the pair of gears, substantially as and for the purpose described.

65. In a motor vehicle, the combination of a body, a truck, a power plant unit carried by the body and including a motor, change speed gearing, and a clutch between the motor and the change speed gearing, an electric generator and an air compressor connected to the change speed gearing, power transmitting parts carried by the truck and connected to the change speed gearing, and connections between the parts carried by the truck and a wheel of the truck, substantially as and for the purpose specified.

66. In a motor vehicle, the combination of a body, a truck, a power plant unit carried by the body and including an internal combustion engine, a change speed gearing comprising driving and driven elements, and a clutch interposed between the motor and the driving element of the change speed gearing, power driven means connected to the driven element of the change speed gearing, power transmitting parts carried by the truck and connected to the driven element of the change speed gearing, and connections between said parts carried by the truck and a wheel of the truck whereby the wheel of the truck may be driven by power from the engine through the gearing and the power transmitting parts, and the power driven means can be actuated from the truck during coasting, substantially as and for the purpose set forth.

In testimony whereof, we have signed our names at Washington, in the District of Columbia, this 15th day of April, 1916.

WILLARD C. LIPE.
LAURENCE H. KIRK.